(12) United States Patent
Hu et al.

(10) Patent No.: US 6,968,731 B2
(45) Date of Patent: Nov. 29, 2005

(54) HIGH SPEED GLIDE TEST FOR SCREENING MAGNETIC DISC MICRO-WAVINESS AND A SYSTEM THEREFOR

(75) Inventors: Yong Hu, Union City, CA (US); Eric Kenneth Dahlin, San Jose, CA (US); Shih-Fu Lee, Fremont, CA (US); Hamid F. Ghazvini, San Jose, CA (US); Elias Ted Johnson, Jr., Apple Valley, MN (US)

(73) Assignee: Seagate Technology, Scotts Valley, CA (US)

( * ) Notice: Subject to any disclaimer, the term of this patent is extended or adjusted under 35 U.S.C. 154(b) by 73 days.

(21) Appl. No.: 10/628,390

(22) Filed: Jul. 29, 2003

(65) Prior Publication Data

US 2005/0022586 A1    Feb. 3, 2005

(51) Int. Cl.[7] .................................................. G01B 5/28
(52) U.S. Cl. .............................................................. 73/105
(58) Field of Search ........................... 73/104, 105, 1.89; 324/212

(56) References Cited

U.S. PATENT DOCUMENTS

| | | | |
|---|---|---|---|
| 5,237,861 A | | 8/1993 | Suda et al. |
| 5,410,402 A | * | 4/1995 | Li et al. ................... 356/243.3 |
| 6,026,676 A | | 2/2000 | Chen et al. |
| 6,164,118 A | | 12/2000 | Suzuki et al. |
| 6,262,572 B1 | * | 7/2001 | Franco et al. ................ 324/212 |
| 6,408,677 B1 | | 6/2002 | Suzuki |
| 6,568,252 B1 | | 5/2003 | Boutaghou |

* cited by examiner

Primary Examiner—Charles Garber
(74) Attorney, Agent, or Firm—Morrison & Foerster LLP

(57) ABSTRACT

A system and a method for measuring micro-waviness of a magnetic recording disk using a high-speed glide test are disclosed. The HSG test is a viable production-level test methodology for high performance media that require well-controlled and low micro-waviness.

20 Claims, 7 Drawing Sheets

HIGH SPEED GLIDE TEST FOR SCREENING MAGNETIC DISC MICRO-WAVINESS AND A SYSTEM THEREFOR

FIELD OF THE INVENTION

The present invention relates to a system and method for screening and measuring micro-waviness of magnetic disks by a high-speed glide test.

BACKGROUND

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

Data are written onto and read from a rapidly rotating recording disk by means of a magnetic head transducer assembly that flies closely over the surface of the disk. It is considered desirable during reading and recording operations to maintain each transducer head as close to its associated recording surface as possible, i.e., to minimize the fly height of the head. This objective becomes particularly significant as the areal recording density increases. The areal density (Gbits/in$^2$) is the recording density per unit area and is equal to the track density (TPI) in terms of tracks per inch times the linear density (BPI) in terms of bits per inch.

The increasing demands for higher areal recording density impose increasingly greater demands on flying the head lower. Generally speaking, the lower the HMS, where HMS is the space between the head and the media, the higher the recording density. For example, the output voltage of a disk drive (or the readback signal of a reader head in disk drive) is generally proportional to 1/exp(HMS). Therefore, a smooth recording surface is preferred, as well as a smooth opposing surface of the associated transducer head, thereby permitting the head and the disk to be positioned in closer proximity with an attendant increase in predictability and consistent behavior of the air bearing supporting the head.

Most of the current magnetic disks are normally driven by the contact start stop (CSS) method, while many advanced disk drives, especially for lap top computers, are using the load/unload ramp design mechanism.

In the load/unload ramp design, the head is parked off the disk when the disk drive is not in use. This is conventionally done by the use of a load and unload ramp, wherein a load and unload tang of a head suspension assembly slides along, thereby moving the head between a position on the disk and a position parked off the disk.

In the CSS method, the head begins to slide against a landing zone of the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk landing zone. During reading and recording operations, the transducer head is maintained at a controlled distance from the recording surface, supported on a bearing of air as the disk rotates. The magnetic head unit is arranged such that the head can be freely moved in both the circumferential and radial directions of the disk in this floating state allowing data to be recorded on and retrieved from the surface of the disk at a desired position.

Upon terminating operation of the disk drive; the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

As explained above, as the fly height of magnetic hard disk drives continues to decrease, the product drive head-disk-interface (HDI) flyability is becoming increasingly dominated by the dynamic interaction between the head air bearing resonance characteristics and disk micro-waviness. Indeed, most of the drive-level flyability failures that we are facing now are directly resulted from the excessive HMS modulation. Therefore, controlling magnetic disk micro-waviness is a critical step in ensuring a good reliability of the magnetic hard disk drives.

U.S. Pat. No. 6,568,252 deals with how to establish the point of contact as a base line that indicates the location of the disc surface, and once the base line is established, how to fly the glide head with greatly increased precision at the desired glide height. U.S. Pat. No. 6,026,676 discloses how to determine the glide avalanche break point. U.S. Pat. No. 5,237,861 relates to a disk inspection apparatus for inspecting protuberance on the disk surface that includes an inspection head detecting the protuberance by a piezoelectric sensor and a rotating speed control circuit controlling a rotating speed of the magnetic disk.

The present invention describes a method for measuring very small changes in recorded signals on a spin-stand tester and a system therefore. Particularly, this invention focuses on correcting sensitivity changes of the transducer. The present invention deals with a technique that allows the measurement of signal changes much more sensitively than that possible by the prior art methods. In addition, data could be acquired one order of magnitude faster than that done using the prior art methods.

SUMMARY OF THE INVENTION

The above-cited references do not relate to a High Speed Glide test using the amplified head air bearing resonance at a high speed to sense media micro-waviness to which this invention is directed. The test methodology (High Speed Glide or HSG) offers an easy-to-implement and yet very effective way for screening disk micro-waviness that is dominating today's flyability of the magnetic hard disk drives.

This invention is directed to system and a method for screening and measuring micro-waviness of a disk.

One embodiment is a system for screening micro-waviness of a disk having micro-waviness comprising the disk, a head comprising a detector and a software or a hardware that measures a slope of an output of the detector versus a linear velocity of the disk or a fly height of the head. Preferably, the detector is a piezoelectric transducer and the output is voltage. Generally, the output increases with an increase in the linear velocity or the fly height and the output substantially correlates with a micro-waviness of a disk measured by an optical surface topography metrology tool.

Preferably, the head is calibrated against a standard head. Preferably, the disk is a magnetic recording disk that generally inherently has asperities and waviness. Preferably, the detector picks up disk micro-waviness induced air-bearing resonance.

Another embodiment is a system for measuring micro-waviness of a disk having micro-waviness comprising the disk, a head comprising a detector and means for measuring a slope of an output of the detector versus a linear velocity of the disk or a fly height of the head.

Yet another embodiment is a method for screening a disk having micro-waviness comprising detecting head air bearing resonance by a detector in a head and measuring a slope of an output of the detector versus a linear velocity of the disk or a fly height of the head.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings, wherein.

DETAILED DESCRIPTION OF THE INVENTION

Figure 1:
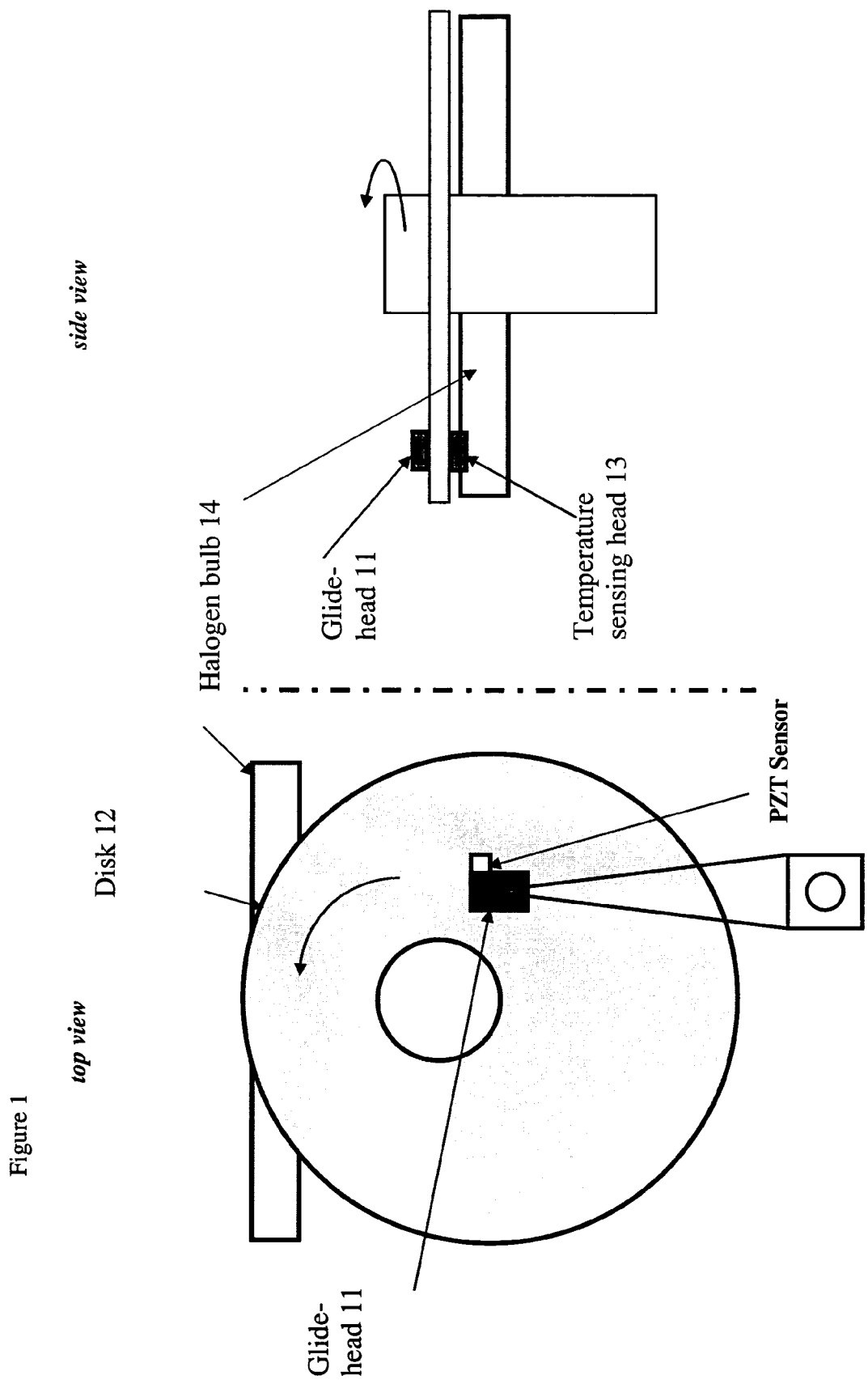
FIG. 1 shows the top and side views of a disk used in measuring signal decay in a method of this invention.

In one embodiment, the high speed glide data is taken at room temperature with a glide head 11 having a piezoelectric transducer (PZT), which the inventors unexpectedly found to work as a detector for sensing disk micro-waviness at high glide speed, flying on the top surface of the disk 12 as shown in the top view of FIG. 1. Optionally, a second glide head 13, flown on the bottom side of the disk 12, is used to sense the micro-waviness of the underside of the disk as shown in the side view of FIG. 1.

Optionally, the disk 12 could be heated using halogen bulb 14 that is mounted in close proximity of the disk 12 as shown in the top and side views of FIG. 1. Since the resistance of the PZT of head 13 depends linearly on the temperature, variation in temperature of the disk could provide an additional variable to monitor the disk surface micro-waviness or the halogen bulk 14 can be used to control the temperature of the disk.

In one embodiment, in the glide setup of FIG. 1, the spindle RPM is ramped up to a level such that the glide head exhibits a strong air bearing resonance. The inventors unexpectedly found that the slope of the glide head's PZT output versus disk linear velocity can then be used to differentiate disk micro-waviness as shown in FIG. 2.

Figure 2:
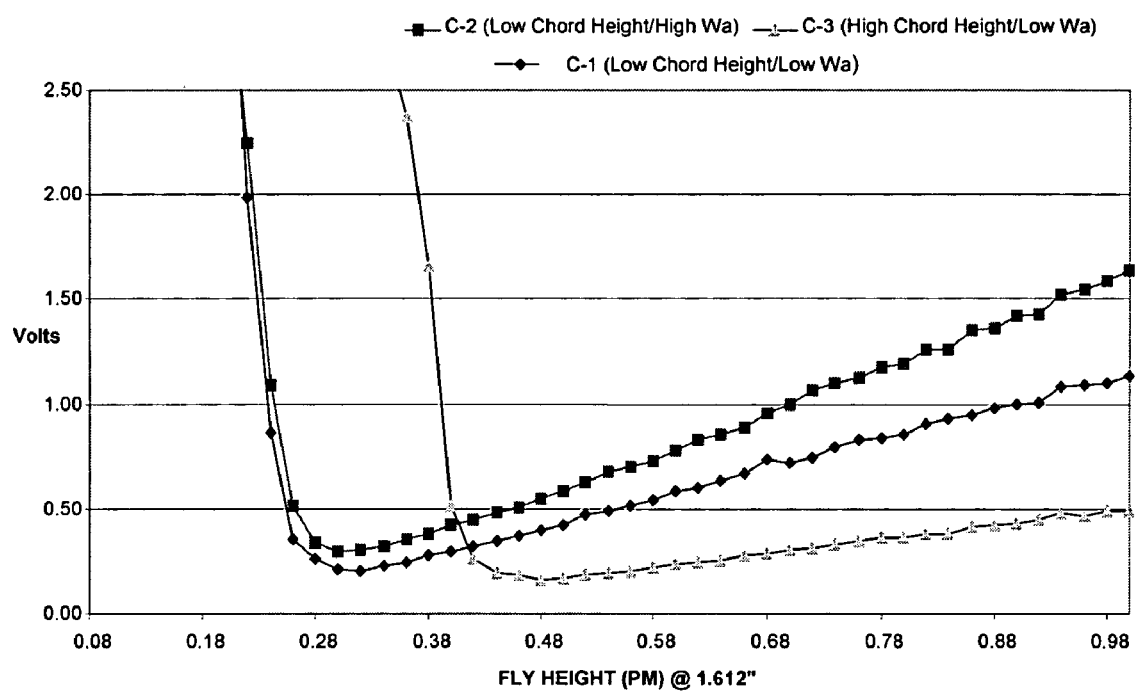
FIG. 2 shows the PZT output of a glide head as a function of the fly height at a distance of 1.612 inch from the center of the disk.

FIG. 2 shows the PZT output in volts as a function of fly height of a head flying at a distance of 1.612" from the center of the disk for glide avalanche (GA) test. Fly height is generally approximately proportional to the linear velocity (or RPM at a given distance from the center of the disk), though it need not necessarily be so. In FIG. 2, the fly height at the lowest point in the PZT versus fly height curves is called the disk "glide avalanche" (GA). When a disk is rotated with slower and slower speed, the fly height decreases until the head starts hitting the asperities on the disk surface. This results in an avalanche in the PZT output when the fly height is lowered below the GA. Prior to this invention, disk micro-waviness was one of the several factors that influence the disk GA. This was done by rotating the disk at a relatively high speed and then reducing the speed while simultaneously monitoring for the PZT output. By this conventional method, one would consider that disks of examples C-1 and C-2 of FIG. 2 as having less micro-waviness than that of the disk of example C-3 due to the lower values of the GA of disks of examples C-1 and C-2 than that of the disk of example C-3.

Instead of relying on the GA as a measure of determining disk micro-waviness, the inventors on this application found that by increasing the RPM of the disk and thereby increasing the fly height past the GA results in a rapid increase in the micro-waviness induced non-contact HMS modulations that excites the PZT of the head. In particular, the applicants found that the micro-waviness of the disk could be correlated to the slope of the PZT output versus fly height curve in the range to the right of the GA point in FIG. 2.

This slope could be measured on a typical existing Glide Tester (such as MC950 tester) with a software modification. In addition to detecting the GA point from the captured data of PZT output versus fly height, the software needs to be modified to record the slope of PZT versus fly height. One way to do it is to calculate the slope value based on the PZT output values at two different fly heights well beyond GA point.

Essentially, the HSG test functions like a unique micro-waviness sensor that becomes more and more sensitive as the disk rotates faster and faster. The HSG test detects a small change in disk micro-waviness that otherwise would not be detected by the low velocity GA test, which exhibits a very low air bearing resonance on today's ultra-smooth disks (very low GA). This test bridges the gap between the traditional media GA testing having low air bearing dynamics and less sensitivity to disk micro-waviness and the product drive head/disk flyability exhibiting strong air bearing dynamics and more sensitivity to disk micro-waviness. The HSG test is a viable production-level test methodology for today's high performance media that demand well-controlled and low micro-waviness.

Figure 3:
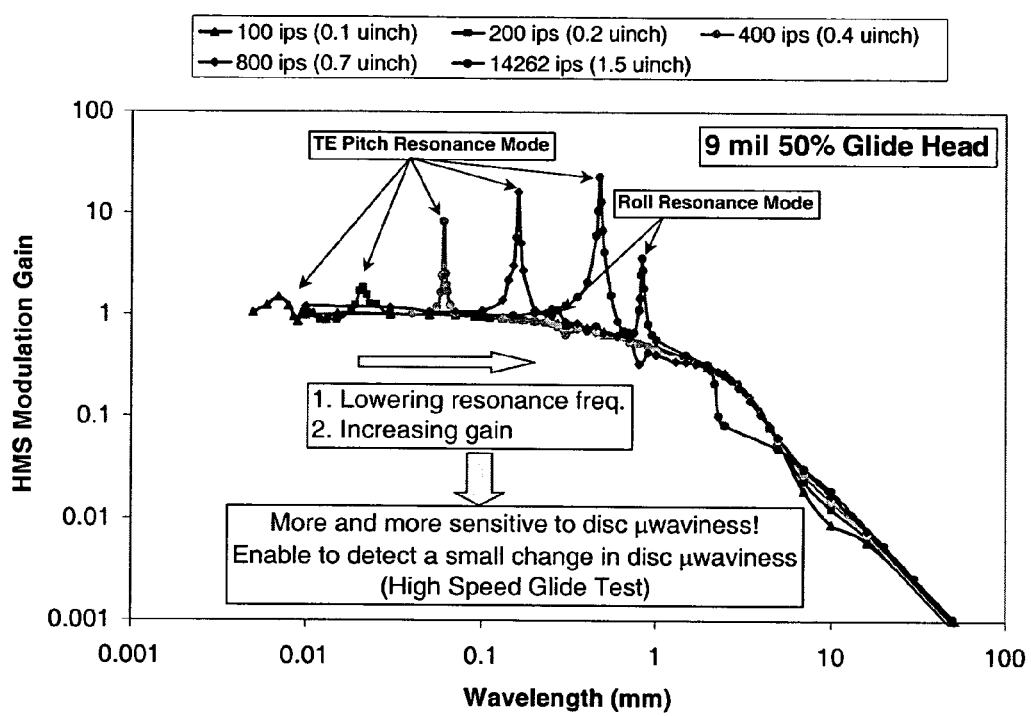
FIG. 3 shows air bearing resonance characteristics of a head at different linear velocity of the disk.

FIG. 3 shows simulated results of head air bearing HMS modulation gain as a function of the wavelength of disk waviness. In particular, FIG. 3 explains why an increase in the PZT output voltage occurs with increasing fly height shown in FIG. 2. FIG. 3 shows the HMS modulation gain for linear disk speeds from 100 inch per second (ips) to 14,262 ips. FIG. 3 shows that a higher ips (which means a higher fly height at a given distance from the center of the disk) results in stronger air bearing resonance peaks, which in turn produce higher HMS modulation gain. This higher HMS modulation gain, coupled with the increased disk waviness amplitude at a longer wavelength, results in a higher HMS modulation that is picked up by the PZT sensor located on the glide head and recoded as the PZT output voltage in FIG. 2.

Correlation Between the HSG Test and Optical Measurement

Figure 4:
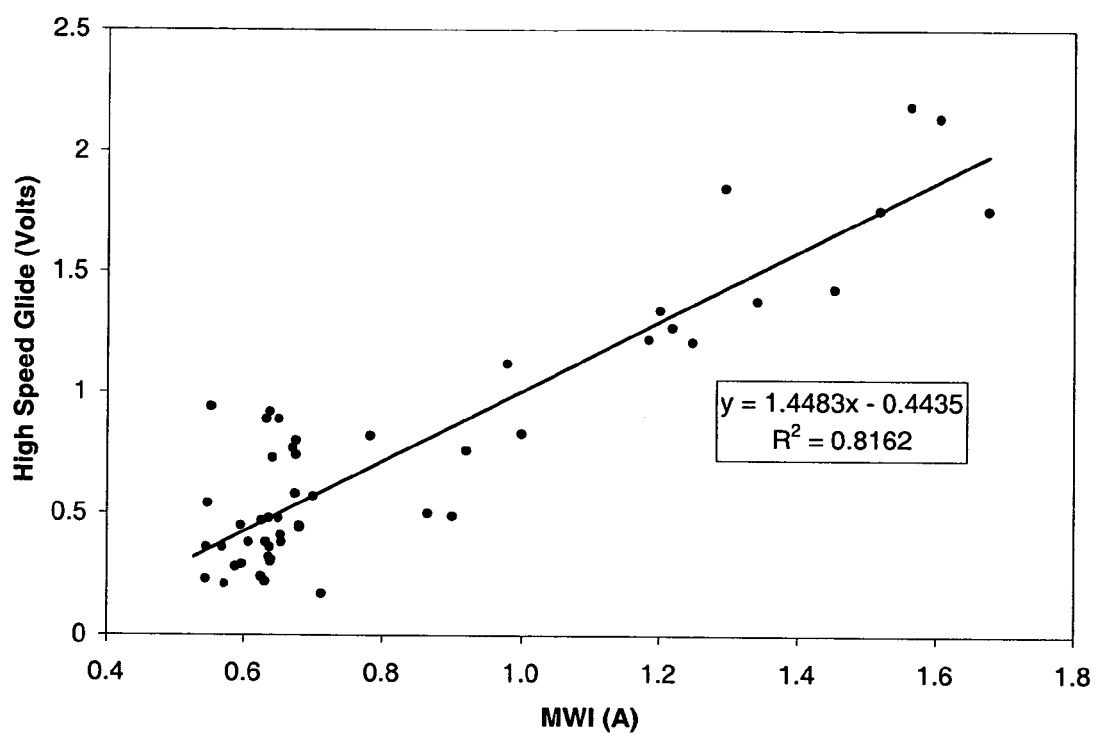
FIG. 4 shows the correlation between HSG output and disk micro-waviness index (MWI) measured by an optical surface topography metrology tool.

The HSG test methodology was extensively tested both in engineering laboratory and on production floor. FIG. 4 shows a strong correlation between the HSG output and the disk micro-waviness index (MWI), measured by a beam-deflection based optical metrology tool, which detects disk topography.

The beam-deflection technique is described by Harrison, "Laser Scanning Surface Profilometer," *IBM Technical Disclosure Bull.*, Vol. 13, No. 3, August 1970, pp. 789–790. and Rosenfeld, A. H. and Zanoni, A. "Noncontact Surface Profilometer," U.S. Pat. No. 3,885,875, which are incorporated herein by reference. This technique measures the slope of the topography as the incident light is deflected by the surface waviness/roughness. The movement of the beam is detected by a position sensitive detector. The displacement of the topography can be obtained by integrating the measured slope. This optical profilometer scans the topography with the disk spinning, which includes effects from spindle run-out and clamping distortion.

Head Calibration

The optical method of measuring disk micro-waviness does not require a glide head; instead, the tool directly measures disk micro-waviness. However, 100% production testing by an optical method is costly and extremely time consuming. By the HSG test, disk micro-waviness is indirectly measured by measuring the HSG output voltage. However, the HSG output voltage is a function of both disk micro-waviness and properties of the head such as the fly height and PZT sensitivity. Thus, head calibration is desired if multiple heads would be used for determining micro-waviness by the HSG test (such as the case of the production media testing) otherwise there could be "over-reject" that results in the media yield loss as shown in FIG. 5.

Figure 5:
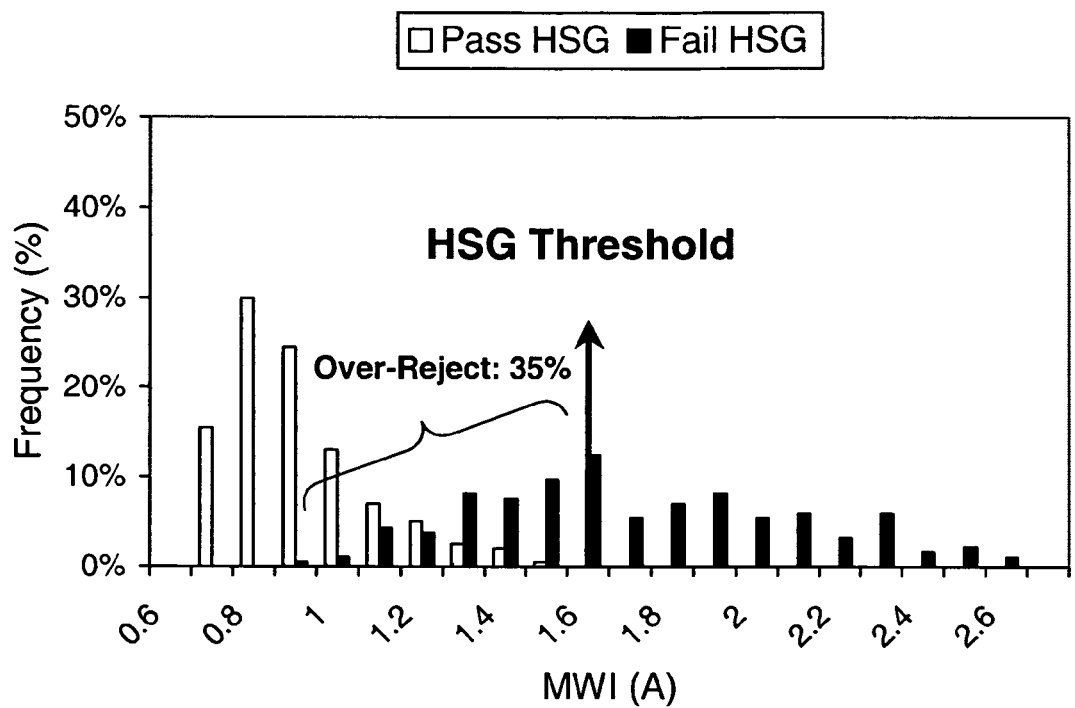
FIG. 5 shows MWI distribution sorted by the un-calibrated HSG with a threshold set to 1.7 Å MWI.

FIG. 5 plots percentage (frequency) of disks from a batch of disks screened by the HSG test (using several glide heads) with a threshold MWI set to 1.7 Å versus the MWI value measured by a beam-deflection based optical metrology tool. It was found that due to head variations, there was about 35% over-rejection based on the micro-waviness measurement by the beam-deflection based optical metrology tool.

Figure 6:
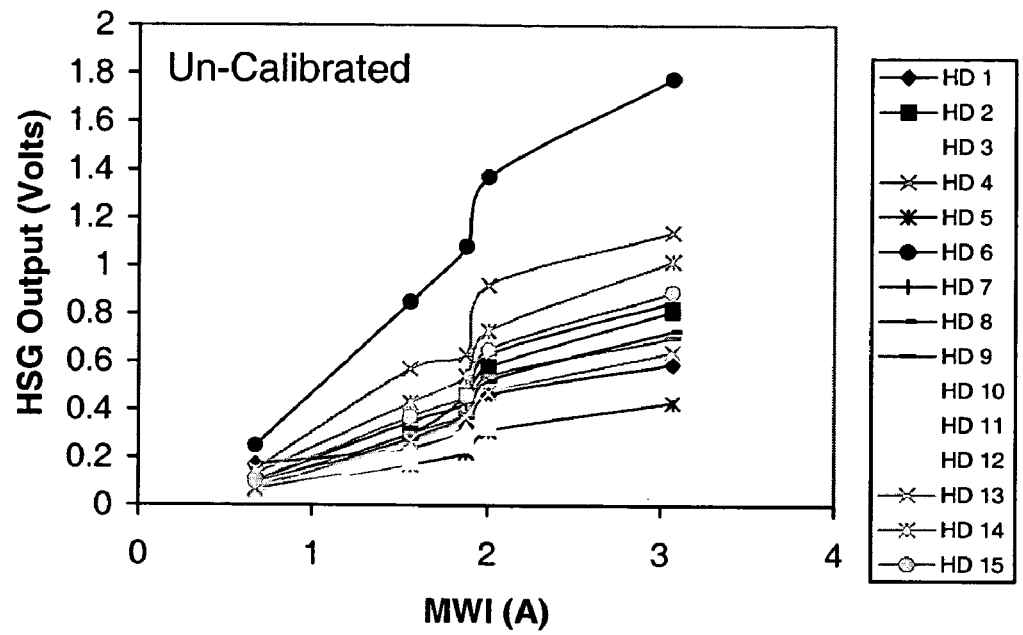
FIG. 6 shows the removal of head-to-head variation in PZT gain by the calibration of the glide heads (top to bottom plots).
Figure 6:
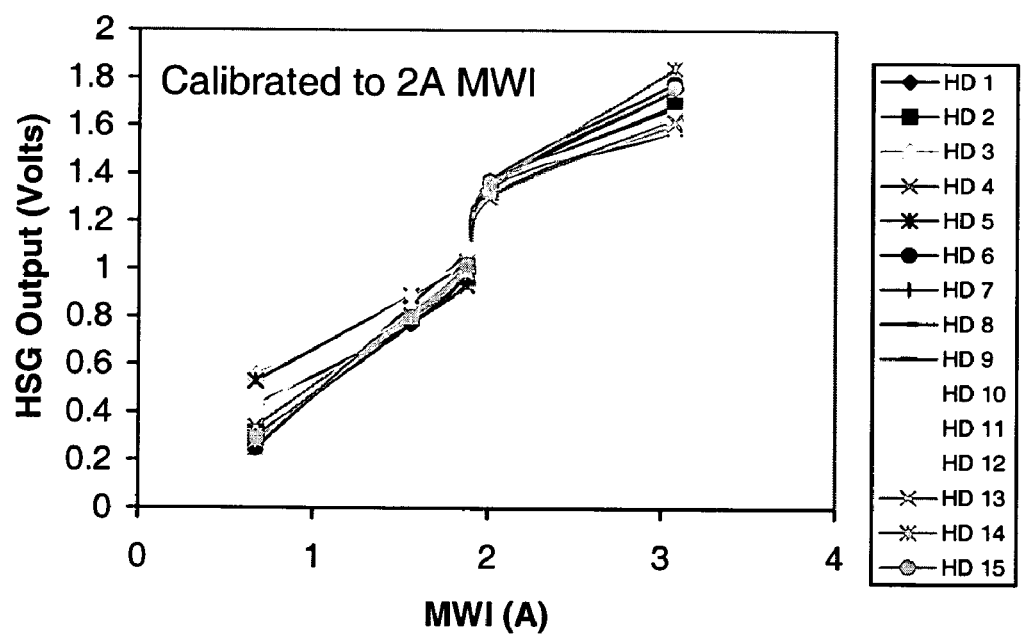

To minimize the over-rejection of the disks due to head variation, it would be preferable to calibrate the heads if multiple heads would be used for disk micro-waviness testing. This calibration could be done as follows:

(1) Select, for example, 5 standard disks of different micro-waviness and one standard head, for example HD 1 of FIG. 6.

(2) Determine the HSG output versus MWI of the five standard disks of HD 1 and plot on a graph as shown in FIG. 6, top and bottom plots.

(3) Determine the HSG output versus MWI of five standard disks of the remaining heads, for example, HD 2 to HD 15, and plot on a graph as shown in FIG. 6, top plot.

(4) Calibrate the HSG output of the remaining heads (HD 2 to HD 15) so as to superimpose on the HSG values at a particular MWI, for example, 2 Å, to the HSG value at that point of the reference head, HD 1.

Figure 7:
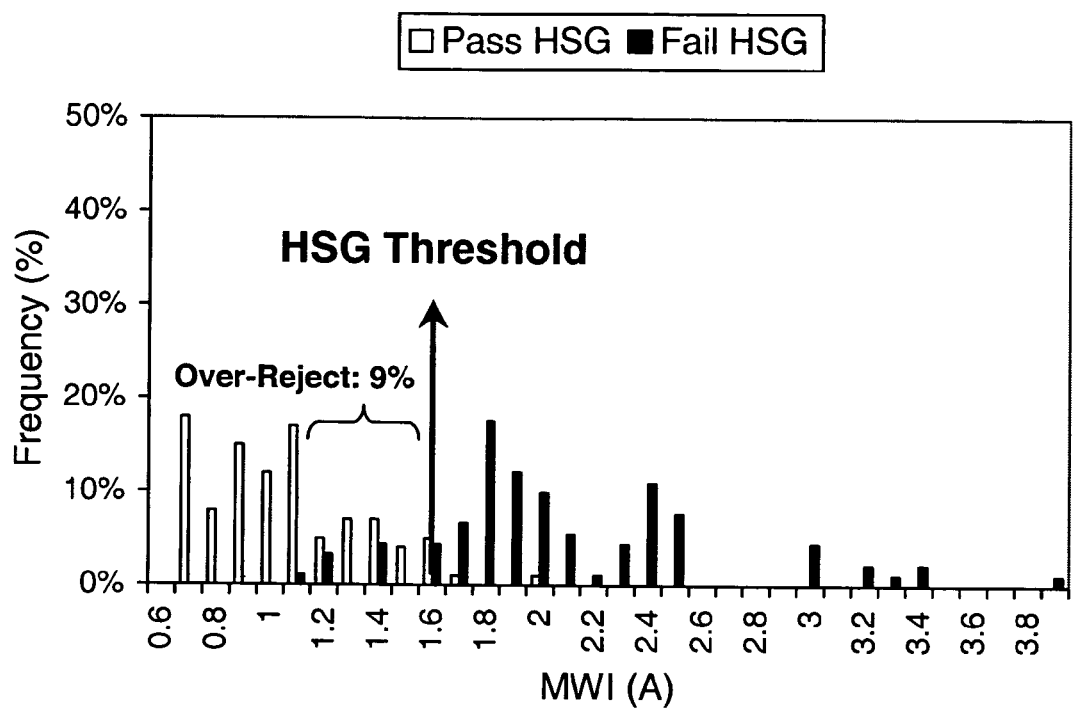
FIG. 7 shows the MWI distribution sorted by a calibrated HSG with a threshold set to 1.6 Å MWI.

FIG. 7 plots percentage (frequency) of disks from a batch of disks sorted by the calibrated HSG test (using several different calibrated heads) with a threshold set to 1.6 Å versus the MWI values measured by a beam-deflection based optical metrology tool. It was found that the over-rejection of the disks due to the glide head variations was significantly reduced by using a calibrated HSG test as shown in FIG. 5.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. The disclosed numerical ranges, even though a precise range limitation is not stated verbatim in the specification, can be practiced throughout the disclosed numerical ranges. Finally, the entire disclosure of the patents and publications referred in this application are hereby incorporated herein by reference.

What is claimed is:

1. A system for screening micro-waviness comprising:
   a disk,
   a head comprising a detector, and
   a software or a hardware that calculates a slope,
   said slope being a change in an output of the detector versus a corresponding change in either (a) a linear velocity of the disk or (b) a fly height of the head, wherein the system measures micro-waviness while simultaneously increasing an RPM of the disk.

2. The system of claim 1, wherein the detector is a piezoelectric transducer.

3. The system of claim 2, wherein the output is voltage.

4. The system of claim 1, wherein the output increases with an increase in the linear velocity or the fly height and the slope is positive.

5. The system of claim 1, wherein the output substantially correlates with a micro-waviness of a disk measured by an optical surface topography metrology tool.

6. The system of claim 1, wherein the head is calibrated against a standard head.

7. The system of claim 1, wherein the disk is a magnetic recording disk.

8. The system of claim 1, wherein the detector picks up disk micro-waviness induced air-bearing resonance.

9. The system of claim 1, wherein the disk comprises asperities and waviness.

10. A method for screening a disk comprising:
    detecting air bearing resonance by a detector in a head, and
    calculating a slope,
    said slope being a change in an output of the detector versus a corresponding change in either (a) a linear velocity of the disk or (b) a fly height of the head, wherein the system measures micro-waviness while simultaneously increasing an RPM of the disk instead of relying on a elide avalanche as a measure of determining disk micro-waviness.

11. The method of claim 10, further comprising measuring micro-waviness of the disk.

12. The method of claim 10, wherein the detector is a piezoelectric transducer.

13. The method of claim 12, wherein the output is voltage.

14. The method of claim 10, wherein the output increases with an increase in the linear velocity or the fly height and the slope is positive.

15. The method of claim 10, wherein the output substantially correlates with a micro-waviness of a disk measured by an optical surface topography metrology tool.

16. The method of claim 10, wherein the head is calibrated against a standard head.

17. The method of claim 10, wherein the disk is a magnetic recording disk.

18. The method of claim 10, wherein the disk comprises asperities and waviness.

19. A system for screening micro-waviness of claim 1, wherein the system measures micro-waviness by increasing an RPM of the disk instead of relying on a glide avalanche as a measure of determining disk micro-waviness.

20. A system for screening micro-waviness comprising:
a disk,
a head comprising a detector, and
means for calculating a slope,
said slope being a change in an output of the detector versus a corresponding change in either (a) a linear velocity of the disk or (b) a fly height of the head, wherein the system measures micro-waviness while simultaneously increasing an RPM of the disk instead of relying on a glide avalanche as a measure of determining disk micro-waviness.

* * * * *